(12) United States Patent
Arikawa et al.

(10) Patent No.: US 10,343,761 B2
(45) Date of Patent: Jul. 9, 2019

(54) REPAIR METHOD OF REPAIR TARGET PORTION, REPAIRED PRODUCT, AND REPAIR APPARATUS

(71) Applicant: MITSUBISHI AIRCRAFT CORPORATION, Aichi (JP)

(72) Inventors: Kiwamu Arikawa, Tokyo (JP); Masayoshi Suhara, Tokyo (JP); Hiroyuki Iseki, Hyogo (JP); Shuhei Muto, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 16/108,520

(22) Filed: Aug. 22, 2018

(65) Prior Publication Data

US 2018/0354604 A1 Dec. 13, 2018

Related U.S. Application Data

(62) Division of application No. 14/227,171, filed on Mar. 27, 2014, now Pat. No. 10,065,727.

(30) Foreign Application Priority Data

Mar. 28, 2013 (JP) .................................. 2013-69373

(51) Int. Cl.
*B27G 11/02* (2006.01)
*B29C 73/00* (2006.01)
(Continued)

(52) U.S. Cl.
CPC ............ *B64C 3/26* (2013.01); *B29C 35/0272* (2013.01); *B29C 73/10* (2013.01); *B64C 1/12* (2013.01);
(Continued)

(58) Field of Classification Search
CPC ..... B29C 65/02; B29C 65/34; B29C 65/3404; B29C 65/342; B29C 65/3428;
(Continued)

(56) References Cited

U.S. PATENT DOCUMENTS 3,378,672 A 4/1968 Blumenkranz
3,679,534 A 7/1972 Weinberg et al.
(Continued)

FOREIGN PATENT DOCUMENTS

DE 102006044487 A1 4/2008
JP 11304080 A * 11/1999 ............ B29C 63/06
JP 2009-208301 A 9/2009

*Primary Examiner* — Philip C Tucker
*Assistant Examiner* — Brian R Slawski
(74) *Attorney, Agent, or Firm* — Pearne & Gordon LLP

(57) ABSTRACT

The present invention sufficiently heats a repairing material while preventing change in quality of a base material provided with the repairing material so as to securely bond the repairing material to a repair target portion. The repair method of the present invention, in order to repair a repair target portion 14 existing in an outer panel 1, includes: a repairing material disposing step of disposing a repairing patch 21 including a resistance heating element 23 and a carbon fiber reinforced resin, and an adhesive 22A including a thermosetting resin before being hardened for bonding the repairing patch 21 on the repair target portion 14; and a heating-hardening step of heating and hardening the thermosetting resin of the adhesive 22A by causing the resistance heating element 23 to generate heat through supply of electricity thereto.

7 Claims, 3 Drawing Sheets

(51) Int. Cl.

| | |
|---|---|
| B29C 65/02 | (2006.01) |
| B31F 5/04 | (2006.01) |
| B32B 43/00 | (2006.01) |
| B32B 38/04 | (2006.01) |
| C08J 5/00 | (2006.01) |
| B29C 65/00 | (2006.01) |
| B32B 37/00 | (2006.01) |
| B64C 3/26 | (2006.01) |
| B29C 73/10 | (2006.01) |
| B29C 35/02 | (2006.01) |
| B64C 1/12 | (2006.01) |
| B64F 5/40 | (2017.01) |
| B29C 65/34 | (2006.01) |
| B32B 27/04 | (2006.01) |
| B32B 27/12 | (2006.01) |
| B29C 65/48 | (2006.01) |
| B29C 73/12 | (2006.01) |
| B29L 31/60 | (2006.01) |

(52) U.S. Cl.
CPC .............. *B64F 5/40* (2017.01); *B29C 65/342* (2013.01); *B29C 65/348* (2013.01); *B29C 65/4835* (2013.01); *B29C 66/1122* (2013.01); *B29C 66/71* (2013.01); *B29C 66/7212* (2013.01); *B29C 73/12* (2013.01); *B29C 2035/0211* (2013.01); *B29L 2031/608* (2013.01); *B32B 27/04* (2013.01); *B32B 27/12* (2013.01); *Y10T 428/20* (2015.01)

(58) Field of Classification Search
CPC ............ B29C 65/3432; B29C 65/3444; B29C 65/3476; B29C 65/348; B29C 65/48; B29C 65/4835; B29C 66/71; B29C 66/1122; B29C 73/10; B29C 73/721; B29C 73/7212; B29C 65/3468; B29C 65/4815; B32B 27/04; B32B 27/06; B32B 27/12; B64F 5/40
USPC .... 156/60, 94, 98, 153, 272.2, 273.9, 294.2, 156/275.5, 275.7, 292, 307.1; 264/36.1, 264/36.11, 36.22, 36.15; 428/116, 118; 29/402.01, 402.09, 402.11, 897.1
See application file for complete search history.

(56) References Cited

U.S. PATENT DOCUMENTS

| | | | |
|---|---|---|---|
| 4,560,428 A | | 12/1985 | Sherrick et al. |
| 5,475,203 A | | 12/1995 | McGaffigan |
| 5,624,750 A | * | 4/1997 | Martinez .................... C09J 5/06 156/273.9 |
| 6,630,044 B1 | | 10/2003 | Boling et al. |
| 2010/0101718 A1 | * | 4/2010 | Maier .................... B29C 65/342 156/272.2 |
| 2012/0099941 A1 | * | 4/2012 | Larsh ...................... B05D 1/02 410/154 |
| 2013/0061970 A1 | * | 3/2013 | Green .................... F16L 55/18 138/99 |

\* cited by examiner

REPAIR METHOD OF REPAIR TARGET PORTION, REPAIRED PRODUCT, AND REPAIR APPARATUS

CROSS-REFERENCE TO RELATED APPLICATIONS

This is a division of prior U.S. application Ser. No. 14/227,171 filed Mar. 27, 2014, now U.S. Pat. No. 10,065,727, which claims priority of Japanese Application No. 2013-69373 filed Mar. 28, 2013. The content of each these applications is incorporated by reference herein in its entirety.

BACKGROUND OF THE INVENTION

Field of the Invention

The present invention relates to a method of repairing a repair target portion existing in a repair target, a repaired product, and a repair apparatus.

Description of the Related Art

An outer panel (skin) forming an outer surface of a fuselage and a wing of an aircraft requires repairing if the outer panel is damaged by a lightning strike or flying objects such as hailstones. As a repairing material for use in such repairing, a composite material, such as fiber reinforced plastic (FRP), is used.

In order to heat and harden the repairing material so as to bond this repairing material to the repair target portion, a heater mat is used, as shown in Japanese Patent Laid-Open No. 2009-208301. The heater mat is placed on the repairing material disposed to the repair target portion. A heat gun or an oven may also be used for heating the repairing material.

An external heat source, such as a heater mat, is used for heating the repairing material to transfer heat from the heat source to the repairing material. At this time, heat is diffused from the heat source and the repairing material to the surroundings of the repairing material. Consequently, a base material (outer panel) where the repairing material is disposed may be changed in quality due to overheating.

If output of the external heat source is decreased in order to avoid change in quality of the base material, insufficient heating is applied to the repairing material, which results in poor hardening, and hinders secure bonding of the repairing material to the repair target portion.

An object of the present invention, which has been made in order to solve the problems according to the conventional art, is to sufficiently heat a repairing material while preventing change in quality of a base material provided with the repairing material so as to securely bond the repairing material to the repair target portion.

SUMMARY OF THE INVENTION

The present invention is a method of repairing a repair target portion existing in a repair target, and includes: a repairing material disposing step of disposing a repairing material, which includes a resistance heating element and a thermosetting resin before being hardened, on the repair target portion; and a heating-hardening step of heating and hardening the thermosetting resin by causing the resistance heating element to generate heat through supply of electricity thereto.

"Before being hardened" in the present invention is defined as a state in which the hardening does not yet have a predetermined hardness.

In the present invention, since the repairing material includes the resistance heating element, the repairing material generates heat so as to heat itself through supply of electricity to the resistance heating element without using an external heat source.

Thermal energy generated by the resistance heating element is efficiently transferred to the thermosetting resin also included in the repairing material. The resistance heating element is caused to generate heat with sufficient quantity of heat for hardening the thermosetting resin, thereby sufficiently heating the repairing material while minimizing thermal diffusion to the surroundings of the repairing material.

According to the present invention, it is possible to securely bond the repairing material to the repair target portion of the base material through completion of hardening of the thermosetting resin at a predetermined hardness while preventing change in quality of the base material provided with the repairing material due to overheating.

The repairing material used in the present invention includes various forms.

The repair method using a composite material in the repairing material includes: a method of laminating fibers, which is formed in a sheet form and impregnated with liquid thermosetting resin, to the repair target portion, and hardening the resin by heating (wet lay-up); and a method of laminating a half-cured intermediate material (prepreg) to the repair target portion, and hardening this material by heating. The above repair method may also include such a method that uses a repairing patch heated and hardened in advance (precured patch), and bonds this repairing patch to the repair target portion with a thermosetting adhesive.

Hence, the repairing material is equivalent to a precured patch formed of a thermosetting resin hardened in advance, and a thermosetting adhesive that bonds the precured patch to the repair target portion, for example.

As another form of the repairing material, the repairing material is equivalent to prepreg formed of a half-hardened thermosetting resin, and a thermosetting adhesive that bonds the prepreg to the repair target portion.

As yet another form of the repairing material, the repairing material is equivalent to a liquid thermosetting resin and fibers in the case of performing the wet lay-up.

It is defined that the repair target portion provided with the above described various repairing materials includes a damaged portion generated in the repair target by impact, high temperature, abrasion, and corrosion, etc., and a predetermined range surrounding this damaged portion.

In the repair method of the present invention, the repairing material may be configured to include: a carbon fiber reinforced resin including a thermosetting resin; and an insulator for insulating the resistance heating element from the carbon fiber reinforced resin.

This configuration prevents the resistance heating element from being short-circuited to the carbon fibers, and thus the present invention is also applicable to a repairing material formed of a carbon fiber reinforced resin.

In the repair method of the present invention, if the repairing material is configured to include: a first repairing material formed of a fiber reinforced resin including the thermosetting resin; and a second repairing material including the thermosetting resin, and bonding the first repairing material to the repair target portion, the resistance heating element may be included in at least one of the first repairing material and the second repairing material.

The first repairing material is equivalent to a repairing patch and prepreg, for example. The second repairing material is equivalent to an adhesive for bonding the repairing patch or the prepreg to the repair target portion. If the resistance heating element is included in at least one of the first repairing material and the second repairing material, the entire repairing material is heated with heat generated by this resistance heating element; therefore, it is possible to sufficiently harden both the thermosetting resin included in the first repairing material and the thermosetting resin included in the second repairing material.

The repair method of the present invention is suitable for repairing a honeycomb core sandwich structural body configured by holding a core having a honeycomb structure that includes a number of cells between outer skins.

Moisture is accumulated inside the core of the honeycomb core sandwich structural body. If the repairing material is heated, the inner pressure of the cells is increased due to vaporized moisture inside the core because of increase in temperature of the core, and thus the honeycomb core sandwich structural body may be destroyed.

According to the present invention, however, it is possible to minimize thermal diffusion to the surroundings of the repairing material, as described above, thereby suppressing vaporization of the moisture inside the core. Accordingly, it is possible to eliminate a drying process inside the core that has been required in the conventional art, resulting in reduction of time required for repairing the honeycomb core sandwich structural body.

The present invention is a method of repairing a repair target portion existing in a repair target, and the method includes: a repairing material disposing step of disposing a repairing material, which includes a resistance heating element and a thermoplastic resin, on the repair target portion; and a step of heating and melting the thermoplastic resin by causing the resistance heating element to generate heat through supply of electricity to the resistance heating element, and thereafter putting the thermoplastic resin into a solidified state.

In the present invention, because the resistance heating element is included in the repairing material, the repairing material generates heat so as to heat itself by supplying electricity to the resistance heating element without using an external heat source.

The thermal energy generated by the resistance heating element is efficiently transferred to the thermoplastic resin also included in the repairing material. Accordingly, the resistance heating element is caused to generate heat with quantity of heat sufficient for melting the thermoplastic resin, thereby sufficiently heating and melting the repairing material while minimizing thermal diffusion to the surroundings of the repairing material.

Hence, according to the present invention, it is possible to securely bond the repairing material to the base material through melting and subsequent hardening of the thermoplastic resin by heating without changing the quality of the base material provided with the repairing material due to overheating.

The present invention may also be developed to a repaired product.

A repaired product of the present invention is produced such that a repairing material including a resistance heating element and a thermosetting resin or a thermoplastic resin is firmly bonded to a repair target portion.

The present invention may be suitably applicable to components included in an aircraft. In this case, the repair target portion exists in a component included in the aircraft.

The present invention may also be developed to a repair apparatus.

A repair apparatus for a repair target portion of the present invention is a repair apparatus of repairing a repair target portion existing in a repair target, and the apparatus includes: a repairing material that includes a resistance heating element and a thermosetting resin or a thermoplastic resin, and is disposed on the repair target portion; and a power source for supplying current to the resistance heating element so as to heat the thermosetting resin or the thermoplastic resin.

According to the present invention, it is possible to sufficiently heat the repairing material while preventing change in quality of the base material, thereby securely bonding the repairing material to the repair target portion of the base material.

DETAILED DESCRIPTION OF THE PREFERRED EMBODIMENTS

Hereinafter, the present invention will be described in detail based on embodiments shown in accompanying drawings.

First, a configuration of an outer panel of an aircraft obtained by repairing will be described.

Figure 1:
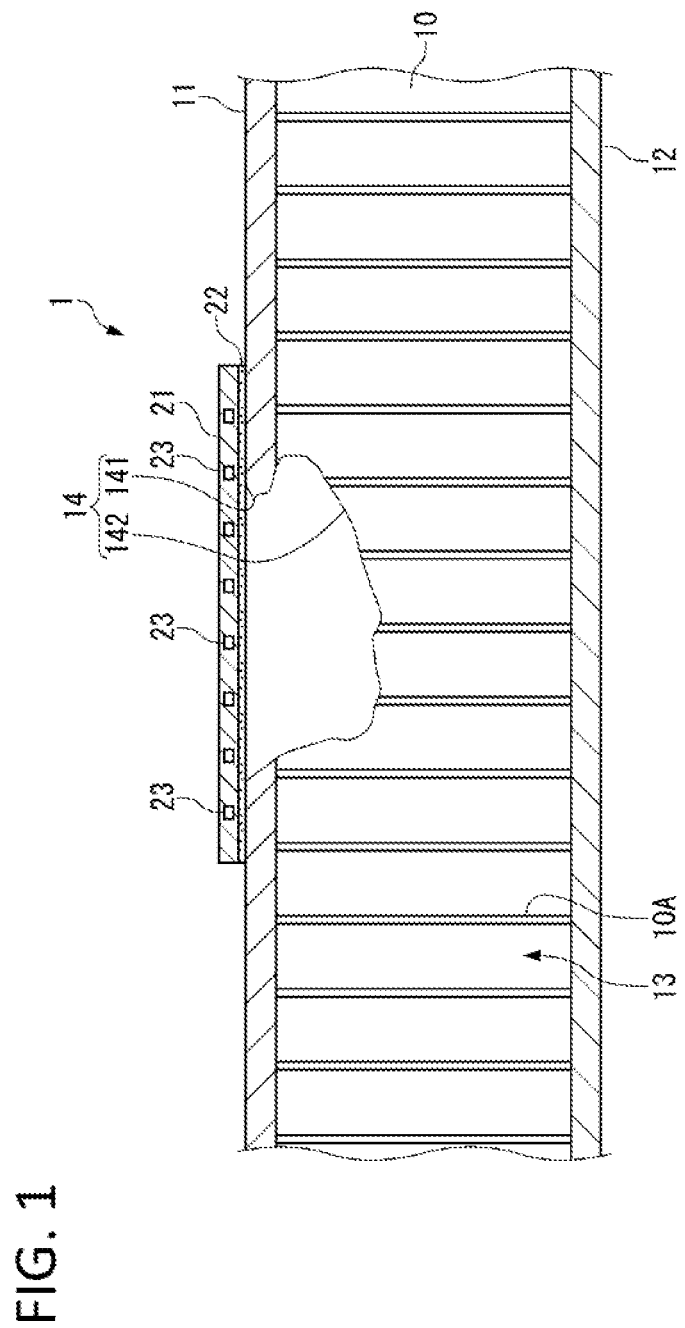
FIG. 1 is a cross sectional view schematically showing an outer panel repaired by a repair method of the present embodiment.

The outer panel 1 shown in FIG. 1 forms an outer surface of a wing of the aircraft. The outer panel 1, not shown, is respectively disposed on upper and lower sides of the wing with a distance therebetween, and the outer panel 1 along with spars that form a front edge and a rear edge of the wing are assembled in a box shape.

This outer panel 1 has such a structure that holds a core (core member) 10 having a honeycomb structure between a couple of outer skins 11, 12 (honeycomb core sandwich structural body). The outer panel 1 may include other layers than the core 10 and the outer skins 11, 12.

The outer panel 1 may constitute the outer surface of a fuselage of the aircraft.

The core 10 includes bulkheads 10A that form a number of cells 13 each having a hexagon cross section. The core 10 is made of a composite material, a metallic material, or a resin material, etc.

The core 10 has a hollow space inside each cell 13, and thus includes air thereinside. Moisture is contained in the air. The moisture is also held in each bulkhead 10A. Water droplets may be produced on the surfaces of the bulkheads 10A by dew condensation. Hence, the moisture is accumulated inside the core 10 (inside the cells 13 and on the bulkheads 10A).

The outer skins 11, 12 are made of a composite material, a metallic material, or a resin material, and are fixed to the end surfaces of the core 10. The outer skins 11, 12 cover openings surrounded by the bulkheads 10A so as to seal the cells 13.

The outer panel 1 may be damaged by receiving impact of a lightning strike or a hailstorm. Such damage may generate a repair target portion 14 required to be repaired in the outer panel 1.

The repair target portion 14 is generated such that a flying object, such as a hailstone, penetrates the outer skin 11, and reaches the inside of the core 10. A damage hole 141 is formed through the outer skin 11 in the thickness direction of the outer skin 11. A damage recess 142 continued to the damage hole 141 is formed in the core 10.

The repair target portion 14 denotes a damaged portion that is an inner surface of the damage hole 141 and the damage recess 142, and a predetermined area including the surroundings of the damaged portion.

If the damage hole 141 is formed, rain water and rinse water may infiltrate into the core 10 through the damage hole 141, which facilitates moisture accumulation inside the core 10.

In the present embodiment, the damage hole 141 is covered with a plate-like repairing patch 21 (first repairing material) formed of a carbon fiber reinforcement resin, and the repairing patch 21 is bonded to the surroundings of the damage hole 141.

The outer skin 11 around the damage hole 141 preferably has a surface prepared to be suitable for being bonded to the repairing patch 21 through sanding and rinse.

In the present embodiment, the damage recess 142 is left as a cavity with filling nothing therein, but the damage recess 142 may be filled with a material for repairing.

The repairing patch 21 is produced by laminating carbon fibers formed in a sheet form, impregnating thermosetting resin, such as epoxy, polyimide, polyurethane, and unsaturated polyester, in the laminated material, and heating this thermosetting resin to be hardened. The repairing patch 21 may be a precured patch that is cured in advance before the repairing.

A conductive lightning protection material formed in a sheet form may be laminated onto the repairing patch 21.

The repairing patch 21 includes a linear resistance heating element 23, and an insulation film 24 covering the outer circumference of the resistance heating element 23 (FIG. 2A), in addition to the carbon fibers and the thermosetting resin.

Figure 2A:
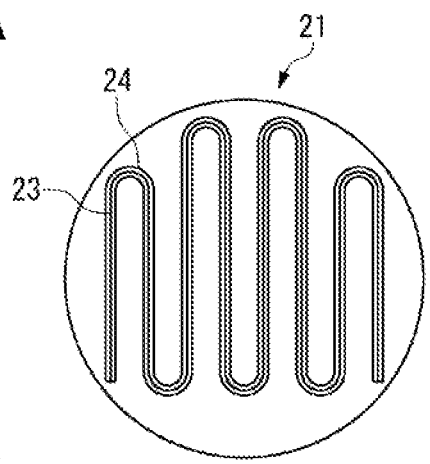
FIG. 2A is a plan view of a repairing patch according to the present embodiment.

The resistance heating element 23 is formed of a material having large resistivity, such as an alloy of nickel and chrome (nichrome), an alloy of iron and chrome, and an alloy of iron, chrome, aluminum, and cobalt, and the resistance heating element 23 generates heat when current is supplied thereto. The resistance heating element 23 is disposed in a serpentine manner in the in-surface of the repairing patch 21, as shown in FIG. 2A.

The insulation film 24 is an insulator formed of an insulation resin, and insulates the resistance heating element 23 from the carbon fibers included in the repairing patch 21. This configuration prevents the resistance heating element 23 from being short-circuited to the carbon fibers.

The resistance heating element 23 and the insulation film 24 are so embedded in the repairing patch 21 as to be disposed between the laminated carbon fiber sheets at the time of producing the repairing patch 21.

Other fibers than the carbon fibers, such as glass fibers, may also be used in the repairing patch 21. The resistance heating element 23 having no insulation film 24 therearound may be directly embedded in a reinforced resin using glass fibers, which is an insulator.

An adhesive layer 22 (second repairing material) formed of a thermosetting resin is disposed between the repairing patch 21 and the outer skin 11. The adhesive layer 22 along with the repairing patch 21 are included in the repairing material 20.

The thermosetting resin used in the adhesive layer 22 may be the same as or different from the thermosetting resin used in the repairing patch 21.

Hereinafter, the repair method of the outer panel 1 will be described with reference to FIGS. 3A and 3B.

Figure 3A:
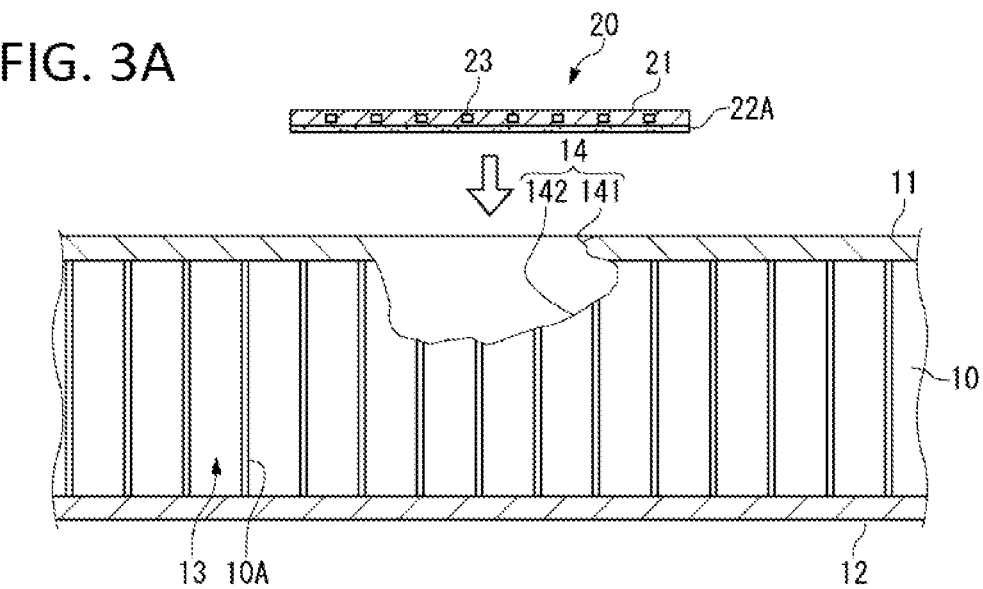
FIG. 3A is a drawing explaining a procedure of a repairing method of the present embodiment.

As shown in FIG. 3A, a thermosetting adhesive 22A formed in a film form, and the repairing patch 21 are disposed on the outer skin 11 around the damage hole 141 (repairing patch disposing step).

The adhesive 22A may be formed in the same shape as that of the repairing patch 21 as shown in the drawing, or may be formed in an annular shape around the damage hole 141.

Figure 3B:
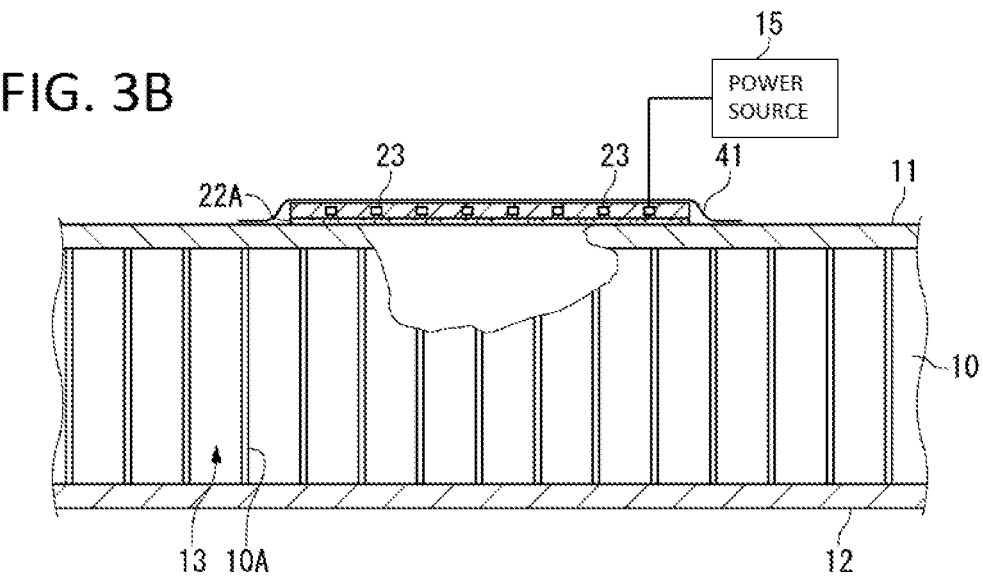
FIG. 3B is a drawing explaining the procedure of the repair method of the present embodiment.

As shown in FIG. 3B, the repairing patch 21 and its surroundings are covered with a thermal resistant bag film 41, and a clearance between the bag film 41 and the outer skin 11 is sealed. Vacuum evacuation is then performed through a valve (not shown) provided on the bag film 41 (vacuum evacuating step). It is preferable to continue the vacuum evacuation even in the subsequent heating-hardening step.

Because of a difference in pressure of the atmosphere between the inside and the outside of the bag film 41 that is depressurized by the vacuum evacuation, the repairing patch 21 is pressed against the surface of the outer skin 11, thereby allowing the repairing patch 21 to be in tight contact with the outer skin 11 through the adhesive 22A.

Subsequently, the resistance heating element 23 included in the repairing patch 21 is connected to a power source 15. Current is supplied from the power source 15 to the resistance heating element 23 so as to cause the resistance heating element 23 to generate heat. Then, thermal energy generated by the resistance heating element 23 is transferred to the thermosetting resin included in the adhesive 22A immediately under the repairing patch 21, and thus the thermosetting resin of the adhesive 22A is hardened (heating-hardening step).

After being hardened, the adhesive 22A firmly adheres to the repairing patch 21 and the outer skin 11 so as to form the adhesive layer 22. The repairing patch 21 is integrally bonded to the outer panel 1 through the adhesive layer 22.

In this manner, the repairing of the outer panel 1 is completed.

According to the repair method of the present embodiment, the repairing patch 21, which is included in the repairing material 20 along with the adhesive 22A, includes therein the resistance heating element 23 functioning as a heat source; thus, it is possible to cause the repairing material 20 required to be heated to generate heat for heating itself without using an external heat source.

In the present embodiment, where the heat source and the heating target are identical, different from the case of using the external heat source, it is not required to generate thermal energy with greater quantity of heat than quantity of heat reaching the repairing material 20 that is the heating target, estimating diffusion of the thermal energy during transmission of the heat.

Specifically, in the present embodiment, the resistance heating element 23 is caused to generate heat with quantity of heat sufficient for hardening the adhesive 22A, thereby sufficiently heating the adhesive 22A as well as minimizing thermal diffusion to the surroundings of the repairing patch 21 and the adhesive 22A.

According to the present embodiment, it is possible to securely bond the repairing patch 21 to the outer skin 11 while preventing change in quality of the outer skin 11 that is the base material provided with the repairing patch 21 due to overheating.

Rigidity of the resistance heating element 23 enhances rigidity of the repairing patch 21, thereby securing sufficient strength of the repaired outer panel 1.

In addition, according to the present embodiment, simply by disposing the repairing material 20 on the repair target portion 14, and connecting the power source 15 to the resistance heating element 23 incorporated in the repairing material 20, preparation for heating the thermosetting resin is completed, so that it is unnecessary to dispose a heater mat on the repairing material 20, and to convey the outer panel 1 and house this in an oven. The power source 15 is only required to be connected to the resistance heating element 23, and thus the power source 15 is unnecessary to be placed close to the outer panel 1. Because the power source 15 is smaller than the heater mat or the oven in size, it is easy to install the power source 15 even in a small-scale airport. Accordingly, the repair method of the present embodiment is feasible in any local airport.

If the core 10 is heated at the time of heating and hardening the adhesive 22A, the temperature inside the core 10 becomes increased, and moisture accumulated inside the core 10 becomes vaporized. The opening of each cell 13 is sealed by the outer skins 11, 12, so that the pressure inside the cells 13 becomes so increased due to the vaporization that a force of peeling off the outer skins 11, 12 from the core 10 is applied to the outer panel 1. A pin hole for releasing water vapor inside the core 10 is formed in the repairing patch 21 in some cases, but if the inner pressure of the cells 13 becomes increased, the outer skins 11, 12 may be peeled off from the core 10.

In the present embodiment, however, it is sufficient for the resistance heating element 23 incorporated in the repairing material 20 to generate quantity of heat to be absorbed by the repairing patch 21 and the adhesive 22A, and thus it is possible to restrict the area to be heated within the repairing patch 21 and the adhesive 22A. Accordingly, it is possible to prevent increase in temperature inside the core 10, thereby preventing destruction of the outer panel 1 caused by increase of the inner pressure of the cells 13.

Accordingly, a process of drying the core 10 in advance for preventing destruction of the outer panel 1 can be eliminated. It takes a very long time to sufficiently dry the core 10 where moisture is contained in the air existing in a number of the cells 13 and in the bulkheads 10A; therefore, the repair method of the present embodiment that eliminates the drying process can significantly reduce time required for the repairing.

Accordingly, the repair method of the present embodiment is suitable for repairing of the outer panel 1 of an aircraft where a scheduled flight service is strongly desired.

Because the resistance heating element 23 of the present embodiment is so disposed in a serpentine manner as to be distributed in the in-surface direction of the repairing patch 21, it is possible to cause the repairing patch 21 to uniformly generate heat across the entire plane thereof.

If the repairing patch 21 is thick, the resistance heating element 23 may be distributed in the thickness direction, thereby allowing the repairing patch 21 to uniformly generate heat across its entire thickness.

The resistance heating element 23 may be formed of any kind of material. For example, a metallic resistance element, such as molybdenum, tungsten, platinum, and molybdenum disilicide, or a non-metallic resistance element, such as silicon carbide, graphite, zirconia, and lanthanum chromite, may be used in the resistance heating element 23.

In the aforementioned embodiment, the resistance heating element 23 is included in the repairing patch 21, and the resistance heating element 23 may also be included in the adhesive 22A. The adhesive 22A including the resistance heating element 23 may be produced by embedding the resistance heating element 23 in the base material of the adhesive 22A. If the base material of the adhesive 22A is formed of an insulation resin, the resistance heating element 23 is insulated by the insulation resin, and thus it is unnecessary to provide the resistance heating element 23 with the insulation film 24.

If the resistance heating element 23 is included in the adhesive 22A, the repairing material 20 generates heat by itself in the same manner as mentioned above; therefore, it is possible to sufficiently heat the adhesive 22A while preventing change in quality of the base material due to overheating.

The resistance heating element 23 may be included in both the repairing patch 21 and the adhesive 22A.

In the above embodiment, the resistance heating element 23 is insulated from the carbon fibers by the insulation film 24, but the resistance heating element 23 may be insulated using any configuration.

Figure 2B:
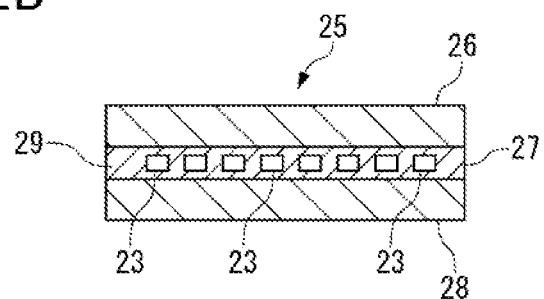
FIG. 2B is a cross sectional view of the repairing patch according to a variation of the present embodiment.

The repairing patch 25 shown in FIG. 2B includes a first CFRP layer 26 formed of a carbon fiber reinforced resin, a heating layer 27 including the resistance heating element 23 and an insulation resin 29, and a second CFRP layer 28 having the same configuration as that of the first CFRP layer 26.

The first CFRP layer 26, the heating layer 27, and the second CFRP layer 28 are laminated in this order so as to adhere to one another.

The first CFRP layer 26 and the second CFRP layer 28 are produced by heating and hardening carbon fibers impregnated with a thermosetting resin.

Figure 2C:
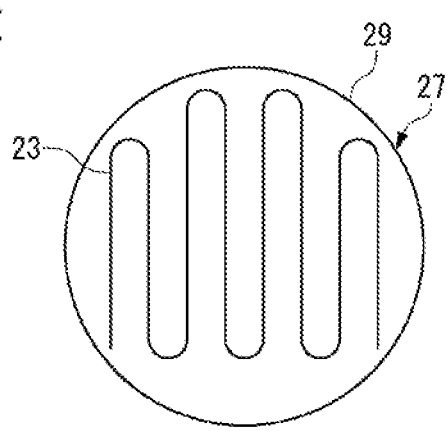
FIG. 2C is a plan view of the repairing patch of this variation.

The heating layer 27 is produced by forming the resistance heating element 23 embedded in the insulation resin 29 into a sheet form. The insulation resin 29 insulates the resistance heating element 23 from the carbon fibers included in both the first CFRP layer 26 and the second CFRP layer 28. Hence, the resistance heating element 23 is embedded in the insulation resin 29 without being provided with the insulation film 24, as shown in FIG. 2C.

The resistance heating element 23 is also included in the repairing patch 25, and thus it is possible to attain the same operation and effect as those described in the present embodiment.

Prepreg may also be used in the repairing material disposed on the repair target portion 14. The resistance heating element 23 is disposed between the laminated carbon fibers of prepreg. If necessary, the resistance heating element 23 is also embedded in a film-like adhesive for bonding the prepreg to the repair target portion 14. This prepreg and the adhesive are included in the repairing material.

The adhesive and the prepreg are disposed on the repair target portion 14, and the thermosetting resin included in both the adhesive and the prepreg are heated and hardened by supplying electricity to the resistance heating element 23.

A fiber thermosetting resin or a liquid thermosetting resin may also be used as the repairing material. The resistance heating element 23 is disposed between the fibers laminated to the repair target portion 14. The thermosetting resin impregnated in the fibers is heated and hardened through supply of electricity to the resistance heating element 23.

A thermoplastic resin, such as nylon, polyethylene, polystyrene, and polyvinyl chloride, may also be used in the repairing material.

For example, in the case of using such a repairing material in which the resistance heating element 23 is embedded in prepreg produced by half-hardening fibers impregnated with the thermoplastic resin, a repairing material disposing step of disposing this repairing material on the repair target portion 14, and a step of causing the resistance heating element 23 to generate heat through supply of electricity thereto, thereby heating and melting the thermoplastic resin, and thereafter putting this thermoplastic resin into a solidified state are performed. In this case, as similar to the case of using the thermosetting resin, the repairing material generates heat by itself because the repairing material includes the resistance heating element 23, and thus it is possible to sufficiently heat and melt the thermoplastic resin without changing the quality of the base material. After the thermoplastic resin is melted, supply of electricity to the resistance heating element 23 is stopped, and the thermoplastic resin is held for a predetermined time so that the thermoplastic resin becomes solidified, thereby allowing the repairing material to firmly adhere to the repair target portion 14.

The outer panel 1 is not limited to the honeycomb core sandwich structural body, and may be configured in any form. For example, an outer panel formed of a fiber reinforced resin across its entire thickness, or even a metallic outer panel may also be the repair target.

The repair method of the present invention is applicable to repairing of not only the outer panel of an aircraft, but also wall materials, floor materials, ceiling materials, and doors included in an aircraft.

The present invention may be applicable to repairing of other structural components and accessories of an aircraft.

In addition, the present invention may be applicable to any repair target other than components included in an aircraft, such as blades of a windmill, and also applicable to repairing of various objects damaged by impact, high temperature, abrasion, and corrosion, etc.

The repair target in the present invention is not limited to a plate-like object. The present invention may be widely applicable to repairing of bonding the repairing material to the repair target portion existing in an object in any form.

Other than the above description, the configurations of the aforementioned embodiments may be appropriately selected, or changed to other configurations without departing from the spirit and scope of the present invention.

What is claimed is:

1. A method of repairing a repair target portion existing in a repair target, the method comprising:
   a repairing material disposing step of disposing a repairing material, which includes a resistance heating element and a thermoplastic resin, on the repair target portion; and
   a step of heating and melting the thermoplastic resin by causing the resistance heating element to generate heat through supply of electricity to the resistance heating element, and thereafter putting the thermoplastic resin into a solidified state,
   wherein the repairing material comprises:
      a carbon fiber reinforced resin including the thermoplastic resin and carbon fibers; and
      an insulator for insulating the resistance heating element from the carbon fibers.

2. The method of repairing a repair target portion according to claim 1, wherein a honeycomb core sandwich structure configured by holding a core having a honeycomb structure including a number of cells between outer skins is repaired as the repair target.

3. The method of repairing a repair target portion according to claim 1, wherein the resistance heating element is embedded in the repairing material prior to the repairing material disposing step.

4. The method of repairing a repair target portion according to claim 1, wherein the resistance heating element and the insulator are embedded in the repairing material prior to the repairing material disposing step.

5. The method of repairing a repair target portion according to claim 1, wherein the resistance heating element is disposed in a meandering manner in an in-surface of the repairing material.

6. The method of repairing a repair target portion according to claim 1, wherein the resistance heating element is distributed in a thickness direction of the repairing material.

7. A repair apparatus of repairing the repair target portion existing in the repair target according to claim 1, the repair apparatus comprising:
   the repairing material; and
   a power source for supplying current to the resistance heating element so as to heat the thermoplastic resin.

* * * * *